United States Patent
Ding et al.

(10) Patent No.: US 11,746,505 B2
(45) Date of Patent: Sep. 5, 2023

(54) BUCKET HEIGHT NOTIFICATION DEVICE AND BUCKET HEIGHT NOTIFICATION METHOD

(71) Applicant: KOMATSU LTD., Tokyo (JP)

(72) Inventors: Qi Ding, Tokyo (JP); Yasuhiro Ibusuki, Tokyo (JP); Jun Morinaga, Tokyo (JP); Masanori Minagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/043,861

(22) PCT Filed: Jul. 18, 2019

(86) PCT No.: PCT/JP2019/028250
§ 371 (c)(1),
(2) Date: Sep. 30, 2020

(87) PCT Pub. No.: WO2020/044834
PCT Pub. Date: Mar. 5, 2020

(65) Prior Publication Data
US 2021/0062473 A1  Mar. 4, 2021

(30) Foreign Application Priority Data
Aug. 31, 2018 (JP) .................. 2018-163917

(51) Int. Cl.
*E02F 9/26* (2006.01)
*G09G 5/377* (2006.01)
(Continued)

(52) U.S. Cl.
CPC ............. *E02F 9/264* (2013.01); *G09G 5/377* (2013.01); *E02F 3/308* (2013.01); *E02F 9/205* (2013.01); *G09G 2380/10* (2013.01)

(58) Field of Classification Search
CPC . E02F 9/264; E02F 3/308; E02F 9/205; E02F 3/435; G09G 5/377; G09G 2380/10;
(Continued)

(56) References Cited

U.S. PATENT DOCUMENTS 6,470,606 B1 * 10/2002 Nagahiro ................ E02F 3/847
                                                                   37/348
2008/0165992 A1 * 7/2008 Kondo ................ H04N 7/0122
                                                                  381/182
(Continued)

FOREIGN PATENT DOCUMENTS

CN       107250466 A       10/2017
CN       107882103 A        4/2018
(Continued)

OTHER PUBLICATIONS

The International Search Report for the corresponding international application No. PCT/JP2019/028250, dated Sep. 24, 2019.

*Primary Examiner* — James A Thompson
*Assistant Examiner* — Kim Thanh T Tran
(74) *Attorney, Agent, or Firm* — Global IP Counselors, LLP (57) ABSTRACT

A bucket height notification device includes a bucket height specification unit and a bucket height notification unit. The bucket height specification unit specifies a bucket height from a ground surface to a bucket of work equipment included in a work vehicle related to remote operation. The bucket height notification unit notifies of the bucket height.

14 Claims, 8 Drawing Sheets

(51) Int. Cl.
*E02F 3/30* (2006.01)
*E02F 9/20* (2006.01)

(58) Field of Classification Search
CPC ............ G09G 2340/12; G09G 2380/12; G06F 3/1446; G06F 3/147
USPC ........................................................ 345/633
See application file for complete search history.

(56) References Cited

U.S. PATENT DOCUMENTS

| | | | | |
|---|---|---|---|---|
| 2011/0069080 | A1* | 3/2011 | Dobrich | G02F 1/133504 345/592 |
| 2014/0100744 | A1* | 4/2014 | Johnson | E02F 9/261 701/50 |
| 2015/0300830 | A1* | 10/2015 | Fisher | B61C 17/12 701/123 |
| 2015/0343976 | A1* | 12/2015 | Lim | E02F 9/261 340/435 |
| 2016/0140929 | A1* | 5/2016 | Chang | G09G 3/20 345/522 |
| 2016/0237655 | A1 | 8/2016 | Baba et al. | |
| 2018/0002899 | A1* | 1/2018 | Morimoto | E02F 9/264 |
| 2018/0051446 | A1 | 2/2018 | Yoshinada et al. | |
| 2018/0094408 | A1 | 4/2018 | Shintani et al. | |

FOREIGN PATENT DOCUMENTS

| | | |
|---|---|---|
| JP | 2004-107925 A | 4/2004 |
| JP | 2016-103301 A | 6/2016 |
| WO | 2015/186215 A1 | 12/2015 |
| WO | 2017/047826 A1 | 3/2017 |
| WO | 2017/199939 A1 | 11/2017 |

\* cited by examiner

BUCKET HEIGHT NOTIFICATION DEVICE AND BUCKET HEIGHT NOTIFICATION METHOD

CROSS-REFERENCE TO RELATED APPLICATIONS

This application is a U.S. National stage application of International Application No. PCT/JP2019/028250, filed on Jul. 18, 2019. This U.S. National stage application claims priority under 35 U.S.C. § 119(a) to Japanese Patent Application No. 2018-163917, filed in Japan on Aug. 31, 2018, the entire contents of which are hereby incorporated herein by reference.

BACKGROUND

Field of the Invention

The present invention relates to a bucket height notification device and a bucket height notification method for a work vehicle related to remote operation.

Background Information

A technology for performing remote operation of a work vehicle is known. In order to perform remote operation of the work vehicle, it is necessary that the surrounding situation of the work vehicle from the outside be capable of being recognized. Therefore, the work vehicle to perform remote operation includes an imaging device that captures an image of the surrounding situation and a communication device that transmits the captured image to the outside. Accordingly, the operator can perform an operation while visually recognizing an image transmitted from the work vehicle.

Further, International Publication No. 2017/047826 discloses a technique for displaying an inclination and an azimuth direction of a work machine on a display device to an operator.

SUMMARY

An operator recognizes a situation of a work vehicle by viewing an image, and operates the work vehicle on the basis of the situation. However, in the case of remote operation, since the operator needs to perform work while viewing a two-dimensional image displayed on a display device, the operator cannot recognize a position of the work equipment with a sense of perspective. In addition, in a manned vehicle, the operator can feel, through the vehicle body, the vibration when the bucket touches the ground, the vibration during work such as excavation, loading, and the like, and can recognize the bucket height based on the vibrations. However, the remote operation does not transmit such vibrations to the operator. Therefore, it is difficult for the operator to estimate the bucket height, and there is a possibility that the work efficiency will be deteriorated.

An object of aspects of the present invention is to provide a bucket height notification device and a bucket height notification method that are capable of notifying an operator of a bucket height of work equipment that is difficult to recognize because of remote operation.

A first aspect of the present invention provides a bucket height notification device, including: a bucket height specification unit configured to specify a bucket height that is a height from a ground surface to a bucket of work equipment included in a work vehicle related to remote operation; and a bucket height notification unit configured to notify of the bucket height.

According to at least one of the above aspects, the control device of a remote operation room can notify the operator of the bucket height of the work equipment that is difficult to recognize because of remote operation.

DETAILED DESCRIPTION OF EMBODIMENT(S)

First Embodiment (Remote Operation System)

Figure 1:
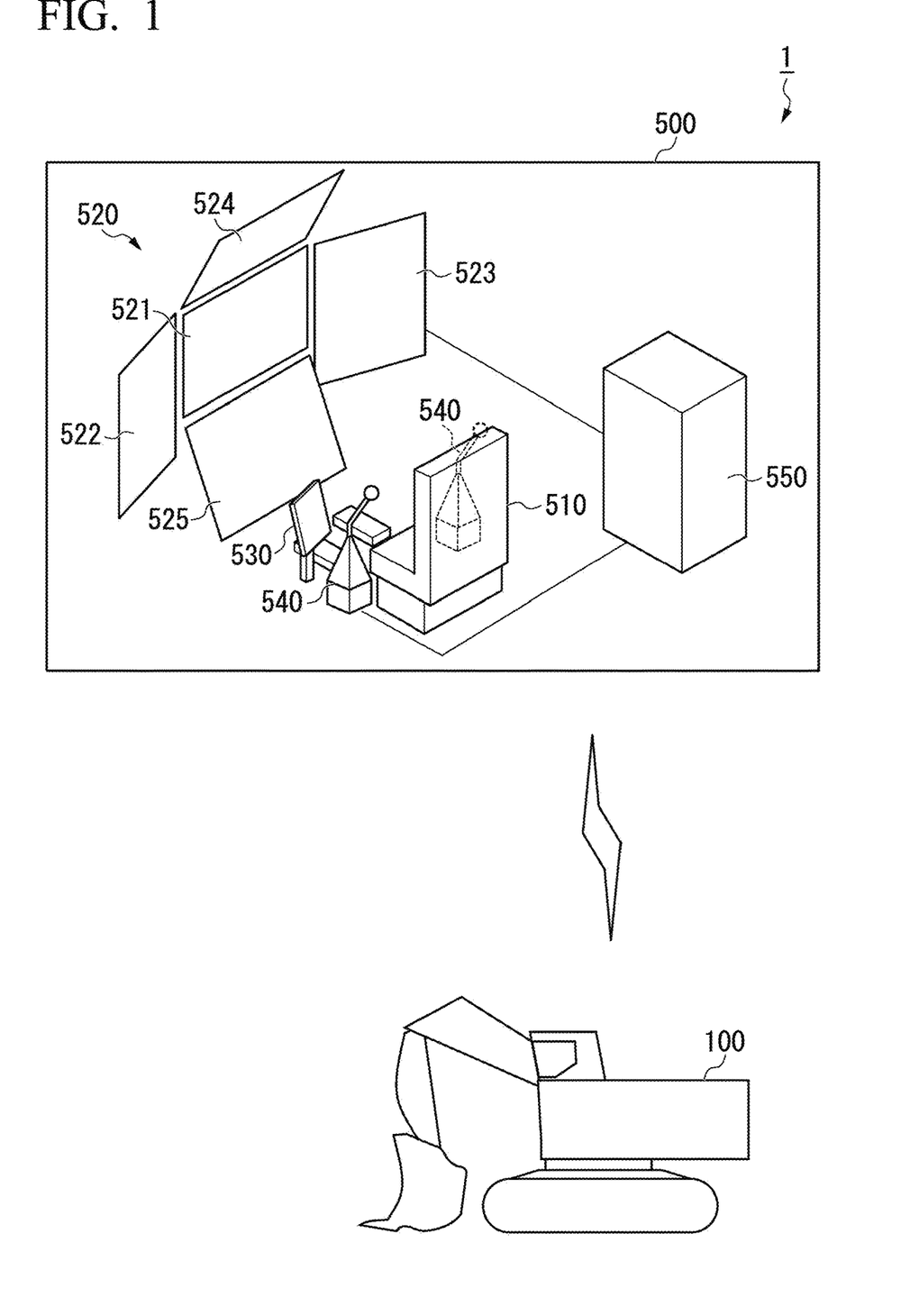
FIG. 1 is a schematic diagram showing a configuration of a remote operation system according to a first embodiment.

FIG. 1 is a schematic diagram showing a configuration of a remote operation system according to a first embodiment.

The remote operation system 1 includes a work vehicle 100 operated by remote operation, and a remote operation room 500 for performing remote operation of the work vehicle 100. The work vehicle 100 operates at a work site (for example, a mine or a quarry). The remote operation room 500 is provided at a location (for example, a city, and in a work site) that is away from the work vehicle 100. The work vehicle 100 and the remote operation room 500 are connected to each other via a communication means such as the Internet.

The remote operation system 1 is a system for operating the work vehicle 100 by using the remote operation room 500.

The work vehicle 100 is operated in response to an operation signal received from the remote operation room 500. That is, the operator does not get on the work vehicle 100.

The remote operation room 500 receives operations of the work vehicle 100 by an operator's operation, and transmits operation signals to the work vehicle 100.

(Remote Operation Room)

The remote operation room 500 includes an operator's seat 510, a first display device 520, a second display device 530, an operation device 540, and a control device 550.

The first display device 520 is disposed in front of the operator's seat 510. The first display device 520 is located in front of the eyes of the operator when the operator sits on the operator's seat 510. The first display device 520 is constituted by a central display 521, a left display 522, a right display 523, an upper display 524, and a lower display 525, which are arranged as shown in FIG. 1. The left display 522 is provided on a left side of the central display 521. The right display 523 is provided on a right side of the central display 521. The upper display 524 is provided on an upper side of the central display 521. The lower display 525 is provided on a lower side of the central display 521.

In addition, in another embodiment, the number of the displays constituting the first display device 520 is not limited to this. For example, the first display device 520 may be configured by one display. Further, the first display device 520 may project an image on a curved surface or a spherical surface by a projector or the like.

The second display device 530 is disposed diagonally forward of the operator's seat 510. The second display device 530 displays the vehicle body information (a remaining amount of fuel, an engine water temperature) transmitted from the work vehicle 100, the notification of an abnormality of the work vehicle 100, and the like. In another embodiment, the position of the second display device 530 does not have to be diagonally forward of the operator's seat 510 as long as the position can be visually recognized by the operator. In addition, the remote operation room 500 according to another embodiment does not have to include the second display device.

The operation device 540 is disposed in the vicinity of the operator's seat 510. The operation device 540 is located within a range operable by the operator when the operator sits on the operator's seat 510. The operation device 540 includes, for example, an electric lever and an electric pedal. When the operator operates the electric lever and the electric pedal, the operation device 540 outputs operation signals of a boom 131, an arm 132, and a bucket 133, a swing operation signal of a swing body 120, and a traveling operation signal of the travel body 110.

The control device 550 causes the first display device 520 to display the image and the vehicle body information received from the work vehicle 100. That is, the control device 550 is an example of a display control device. Further, the control device 550 transmits an operation signal input to the operation device 540 to the work vehicle 100. The control device 550 is an example of a bucket height notification device.

(Work Vehicle)

Figure 2:
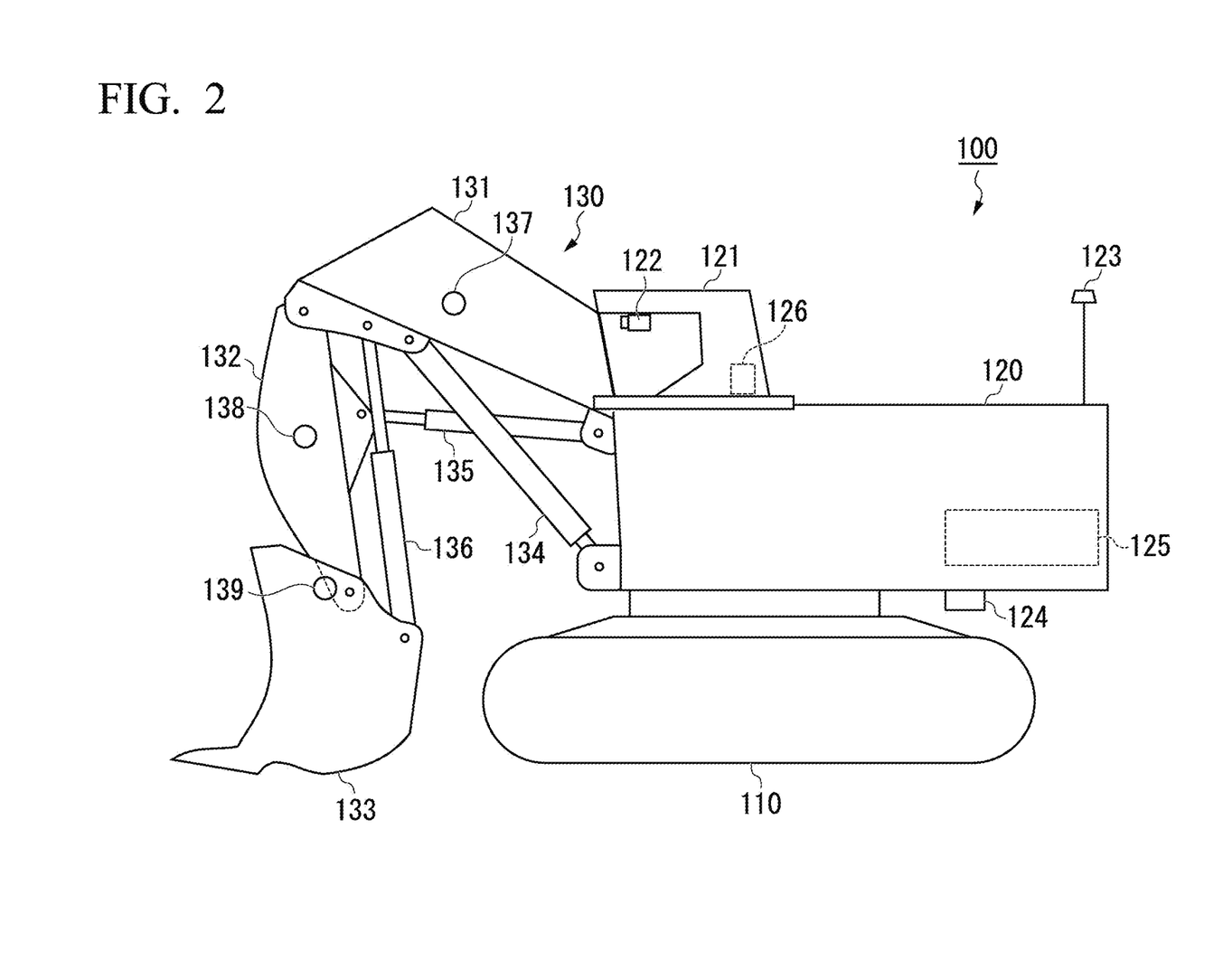
FIG. 2 is an external view of a work vehicle according to the first embodiment.

FIG. 2 is an external view of the work vehicle according to the first embodiment.

The work vehicle 100 according to the first embodiment is a hydraulic excavator. The work vehicle 100 according to another embodiment may be a work vehicle such as a wheel loader, a bulldozer, and the like other than a hydraulic excavator.

The work vehicle 100 includes work equipment 130 driven by a hydraulic pressure, the swing body 120 that supports the work equipment 130, and the travel body 110 that supports the swing body 120.

The work equipment 130 includes the boom 131, the arm 132, and the bucket 133. The work equipment 130 is driven by expansion and contraction of the boom cylinder 134, the arm cylinder 135, and the bucket cylinder 136. A boom angle sensor 137, an arm angle sensor 138, and a bucket angle sensor 139 are respectively attached to the boom 131, the arm 132, and the bucket 133.

A base end portion of the boom 131 is attached to the swing body 120 via a pin.

The arm 132 connects the boom 131 and the bucket 133. A base end portion of the arm 132 is attached to a tip end portion of the boom 131 via a pin.

The bucket 133 includes teeth for excavating earth and a container for accommodating excavated earth. A base end portion of the bucket 133 is attached to a tip end portion of the arm 132 via a pin.

The boom cylinder 134 is a hydraulic cylinder for driving the boom 131. A base end portion of the boom cylinder 134 is attached to the swing body 120. A tip end portion of the boom cylinder 134 is attached to the boom 131.

The arm cylinder 135 is a hydraulic cylinder for driving the arm 132. A base end portion of the arm cylinder 135 is attached to the boom 131. A tip end portion of the arm cylinder 135 is attached to the arm 132.

The bucket cylinder 136 is a hydraulic cylinder for driving the bucket 133. A base end portion of the bucket cylinder 136 is attached to the boom 131. A tip end portion of the bucket cylinder 136 is attached to the bucket 133.

The boom angle sensor 137 is attached to, for example, the boom 131 and detects an inclination angle of the boom 131.

The arm angle sensor 138 is attached to, for example, the arm 132 and detects an inclination angle of the arm 132.

The bucket angle sensor 139 is attached to, for example, the bucket 133 and detects an inclination angle of the bucket 133.

The boom angle sensor 137, the arm angle sensor 138, and the bucket angle sensor 139 according to the first embodiment detect the inclination angles with respect to the ground plane. In addition, the angle sensor according to another embodiment is not limited to this, and an inclination angle with respect to another reference surface may be detected. For example, in another embodiment, the angle sensor may detect a relative rotation angle by the potentiometer provided at the base end portions of the boom 131, the arm 132, and the bucket 133, and may detect inclination angles by measuring cylinder lengths of the boom cylinder 134, the arm cylinder 135, and the bucket cylinder 136 and converting the cylinder length into the angle.

The swing body 120 is provided with a cab 121. The cab 121 is provided on the left side of the work equipment 130. In the cab 121, a front camera 122 is provided. The front camera 122 is installed at a front portion and an upper portion in the cab 121. The front camera 122 captures an image of a front side of the cab 121 through a windshield in front of the cab 121. Here, "forward" refers to a direction in which the work equipment 130 is mounted in the swing body 120, and "rearward" refers to a reverse direction of "forward". The "lateral direction" refers to a direction (left-right direction) intersecting with a front-rear direction. Examples of the front camera 122 include an imaging device using a charge-coupled device (CCD) sensor and a complementary metal oxide semiconductor (CMOS) sensor. In addition, the work vehicle 100 according to another embodiment does not have to include the cab 121. Also in this case, the front camera 122 is installed at a position corresponding to the cab 121 so as to capture an image of the front side. In addition, in another embodiment, the front camera 122 may include two or more cameras.

Figure 3:
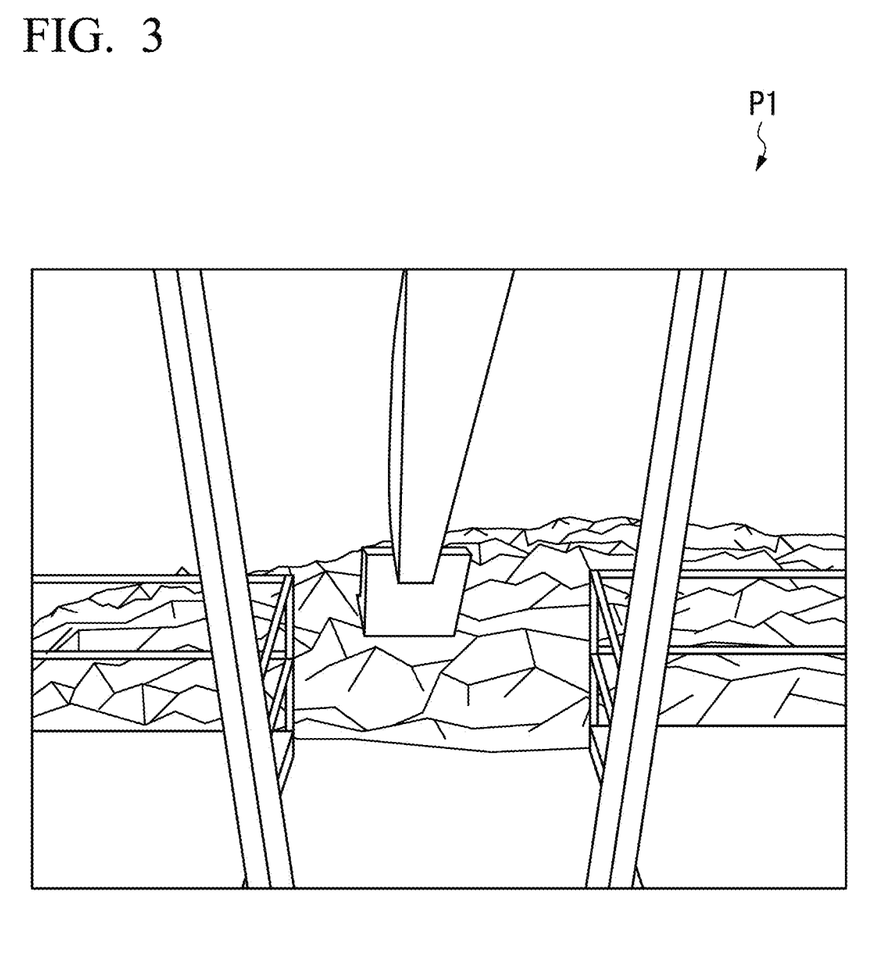
FIG. 3 is an example of an image captured by an imaging device of the work vehicle according to the first embodiment.

FIG. 3 is an example of an image captured by the imaging device of the work vehicle according to the first embodiment. The front camera 122 captures an image of a range in which a work object in front of the work equipment 130 and the cab 121 is captured. That is, as shown in FIG. 3, in the image P1 captured by the front camera 122, the work object in front of the work equipment 130 and the cab 121 is shown. Further, since the cab 121 is provided on the left side of the work equipment 130, part of the boom 131 is included in the right side portion of the image P1.

The work vehicle 100 includes the front camera 122, a position and azimuth direction calculator 123, an inclination measurement device 124, a hydraulic device 125, and a control device 126.

The position and azimuth direction calculator 123 calculates the position of the swing body 120 and the azimuth direction in which the swing body 120 faces. The position and azimuth direction calculator 123 includes two receivers that receive a positioning signal from a satellite configuring a GNSS. The two receivers are installed at different positions in the swing body 120. The position and azimuth direction calculator 123 detects the position of the representative point (the origin of the excavator coordinate system) of the swing body 120 in the site coordinate system based on the positioning signals received by the receivers.

The position and azimuth direction calculator 123 calculates the azimuth direction in which the swing body 120 faces, as a relationship of the installation position of the other receiver with respect to the installation position of one of the receivers by using the respective positioning signals received by the two receivers.

In addition, in another embodiment, the position and azimuth direction calculator 123 may detect a direction in which the swing body 120 faces based on a measurement value of a rotary encoder or an IMU. The work vehicle 100 according to another embodiment does not have to include the position and azimuth direction calculator 123.

The inclination measurement device 124 measures an acceleration and the angular velocity of the swing body 120, and detects the posture of the swing body 120 (for example, a roll angle, a pitch angle, and a yaw angle) based on the measurement result. The inclination measurement device 124 is installed, for example, on a lower surface of the swing body 120. For example, an inertial measurement unit (IMU) may be used as the inclination measurement device 124. In addition, the work vehicle 100 according to another embodiment does not have to include the position and azimuth direction calculator 123.

The hydraulic device 125 includes an operating oil tank, a hydraulic pump, and a flow rate control valve. The hydraulic pump is driven by motive power of an engine or an electric motor (not shown), and supplies operating oil to the boom cylinder 134, the arm cylinder 135, and the bucket cylinder 136 via the flow rate control valve. The flow rate control valve has a rod-shaped spool, and controls the flow rate of the operating oil to be supplied to the boom cylinder 134, the arm cylinder 135, and the bucket cylinder 136 in accordance with the position of the spool. The spool is driven based on a control command received from the control device 126. That is, the amount of the operating oil supplied to the boom cylinder 134, the arm cylinder 135, and the bucket cylinder 136 is controlled by the control device 126.

The control device 126 transmits information on the image captured by the front camera 122, the swing speed, the position, the azimuth direction and the inclination angle of the swing body 120, and the inclination angles of the boom 131, the arm 132 and the bucket 133, to the remote operation room 500. Hereinafter, the information measured by the various sensors included in the work vehicle 100 and transmitted by the control device 126 is also referred to as vehicle body information.

The control device 126 receives operation signals from the remote operation room 500. The control device 126 drives the work equipment 130, the swing body 120, or the travel body 110 based on the received operation signal.

(Control Device of Remote Operation Room)

Figure 4:
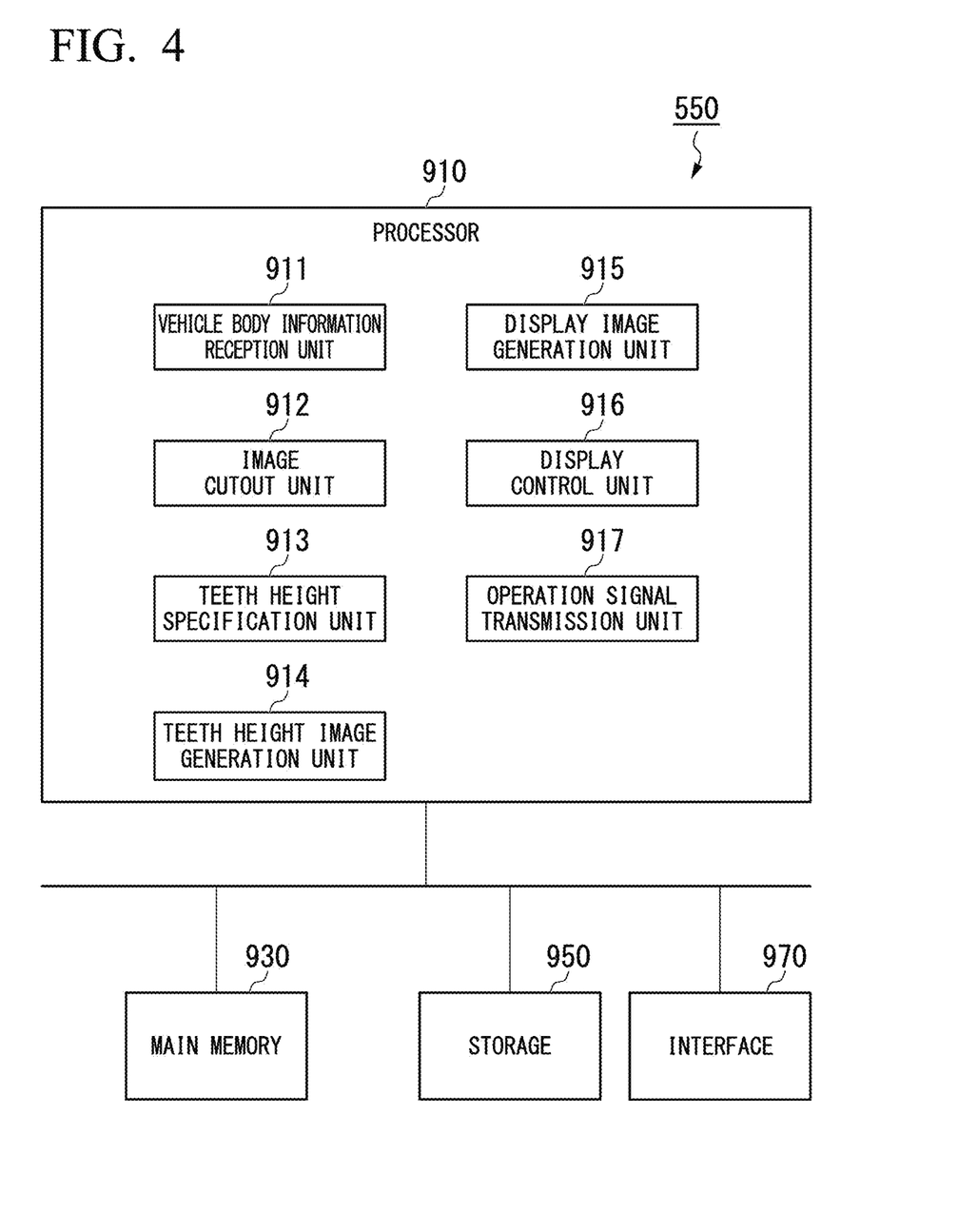
FIG. 4 is a schematic block diagram showing a configuration of a control device for a remote operation room according to the first embodiment.

FIG. 4 is a schematic block diagram showing a configuration of the control device for a remote operation room according to the first embodiment.

The control device 550 is a computer having a processor 910, a main memory 930, a storage 950, and an interface 970. The storage 950 stores a program. The processor 910 reads the program from the storage 950, loads the program in the main memory 930, and executes the processing according to the program.

Examples of the storage 950 include a hard disk drive (HDD), a solid-state drive (SSD), a magnetic disk, a magneto-optical disk, a compact disc read-only memory (CD-ROM), a digital versatile disc read-only memory (DVD-ROM), a semiconductor memory, and the like. The storage 950 may be an internal medium directly connected to the common communication line of the control device 550, or may be an external medium connected to the control device 550 via the interface 970. The storage 950 is a non-transitory tangible storage medium. In another embodiment, the control device 550 may include a custom LSI (Large-scale integrated circuit) such as a PLD (Programmable Logic Device) or may include a semi-custom LSI such as an ASIC (Application-Specific Integrated Circuit), in addition to the above-described configuration or instead of the above-described configuration. Examples of the PLD include a Programmable Array Logic (PAL), a Generic Array Logic (GAL), a Complex Programmable Logic Device (CPLD), and a Field-Programmable Gate Array (FPGA). In this case, some or all of the functions realized by the processor 910 may be realized by the integrated circuit.

The processor 910 includes a vehicle body information reception unit 911, an image cutout unit 912, a teeth height specification unit 913, a teeth height image generation unit 914, a display image generation unit 915, a display control unit 916, and an operation signal transmission unit 917 by executing a program.

The vehicle body information reception unit 911 receives information on the image captured by the front camera 122, the swing speed, the position, the azimuth direction and the inclination angle of the swing body 120, and the inclination angles of the boom 131, the arm 132, and the bucket 133, from the work vehicle 100. That is, the vehicle body information reception unit 911 is an example of a captured image acquisition unit.

Figure 5:
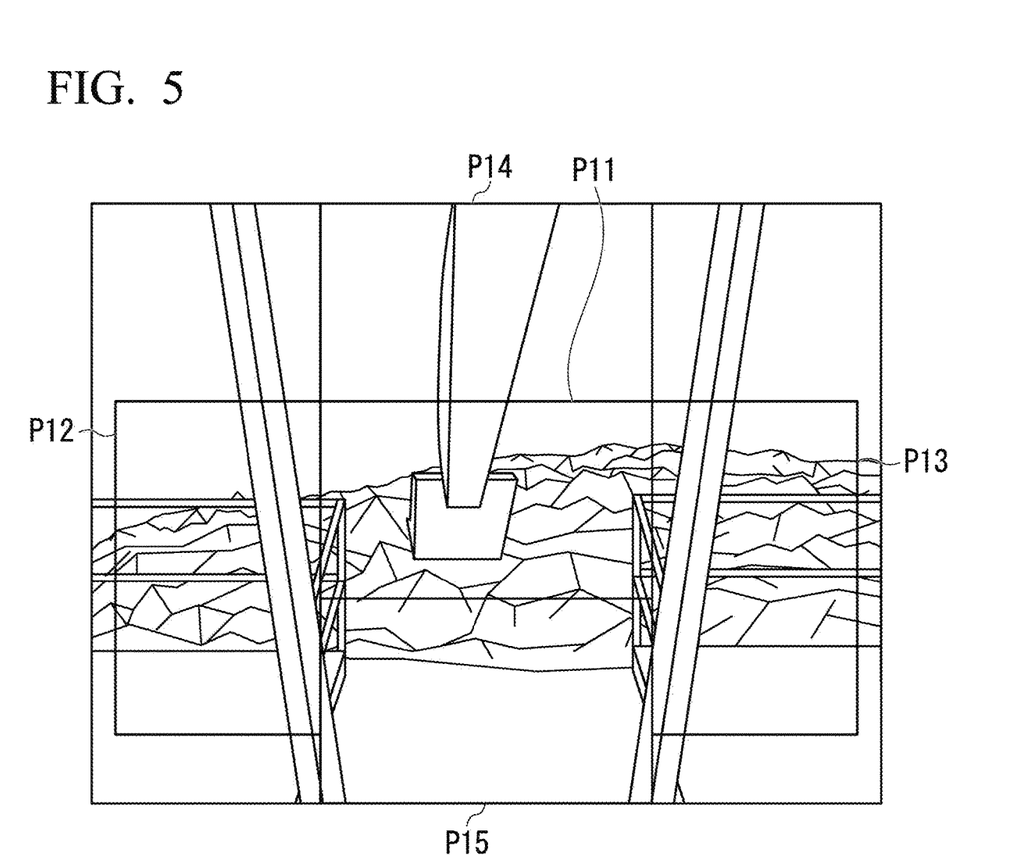
FIG. 5 is a diagram showing an example of an image cut out from an image captured by a front camera.

FIG. 5 is a diagram showing an example of an image cut out from the image P1 captured by the front camera.

The image cutout unit 912 cuts out images including a central image P11 to be displayed on the central display 521, a left image P12 to be displayed on the left display 522, a right image P13 to be displayed on the right display 523, an upper image P14 to be displayed on the upper display 524, and a lower image P15 to be displayed on the lower display 525, from the image P1 captured by the front camera 122 and received by the vehicle body information reception unit 911. In addition, when the first display device 520 is composed of one display, the image cutout unit 912 does not need to cut out the images.

The teeth height specification unit 913 calculates a teeth height that is a height from the ground contact surface of the work vehicle 100 to the teeth of the bucket 133 based on the information on the inclination angles of the boom 131, the arm 132, and the bucket 133 received by the vehicle body information reception unit 911. Specifically, the teeth height specification unit 913 calculates the teeth height of the bucket 133 in the following procedure.

The teeth height specification unit 913 calculates the height of the pin at the tip end portion of the boom 131 based on the known height of the pin at the base end portion of the boom 131, the inclination angle of the boom 131, and the known length of the boom 131. The pin at the tip end portion of boom 131 is a pin at the base end portion of the arm 132. The teeth height specification unit 913 calculates the height of the pin at the tip end portion of the arm 132 based on the height of the pin at the base end portion of the arm 132, the inclination angle of the arm 132, and the known length of the arm 132. The pin at the tip end portion of the arm 132 is a pin at the base end portion of the bucket 133. The teeth height specification unit 913 calculates the teeth height of the bucket 133 based on the height of the pin at the base end portion of the bucket 133, the inclination angle of the bucket 133, and the known length from the base end portion to the teeth of the bucket 133. In another embodiment, the teeth height specification unit 913 may extract a feature point of the teeth from the captured image and detect the height of the feature point, or may attach a laser sensor to the bucket 133 and detect the teeth height based on the detection value of the laser sensor. In addition, the teeth height according to the first embodiment is a height from the ground contact surface of the work vehicle 100 to the teeth of the bucket 133, but another embodiment is not limited thereto. For example, the teeth height according to another embodiment may be a height from the ground surface directly below the teeth of bucket 133 to the teeth. In addition, there is a case in which the ground surface directly below the teeth of the bucket 133 has a height different from that of the ground contact surface of the work vehicle 100. That is, the ground surface directly below the teeth of the bucket 133 may be a ground surface that is higher than the ground contact surface of the work vehicle 100, or may be a ground surface that is lower than the ground contact surface of the work vehicle 100. Also, the ground surface directly below the teeth of the bucket 133 may be a slope. The ground contact surface and the ground surface directly below the teeth of the bucket 133 are examples of the ground surface. The teeth height specification unit 913 is an example of a bucket height specification unit.

Figure 6:
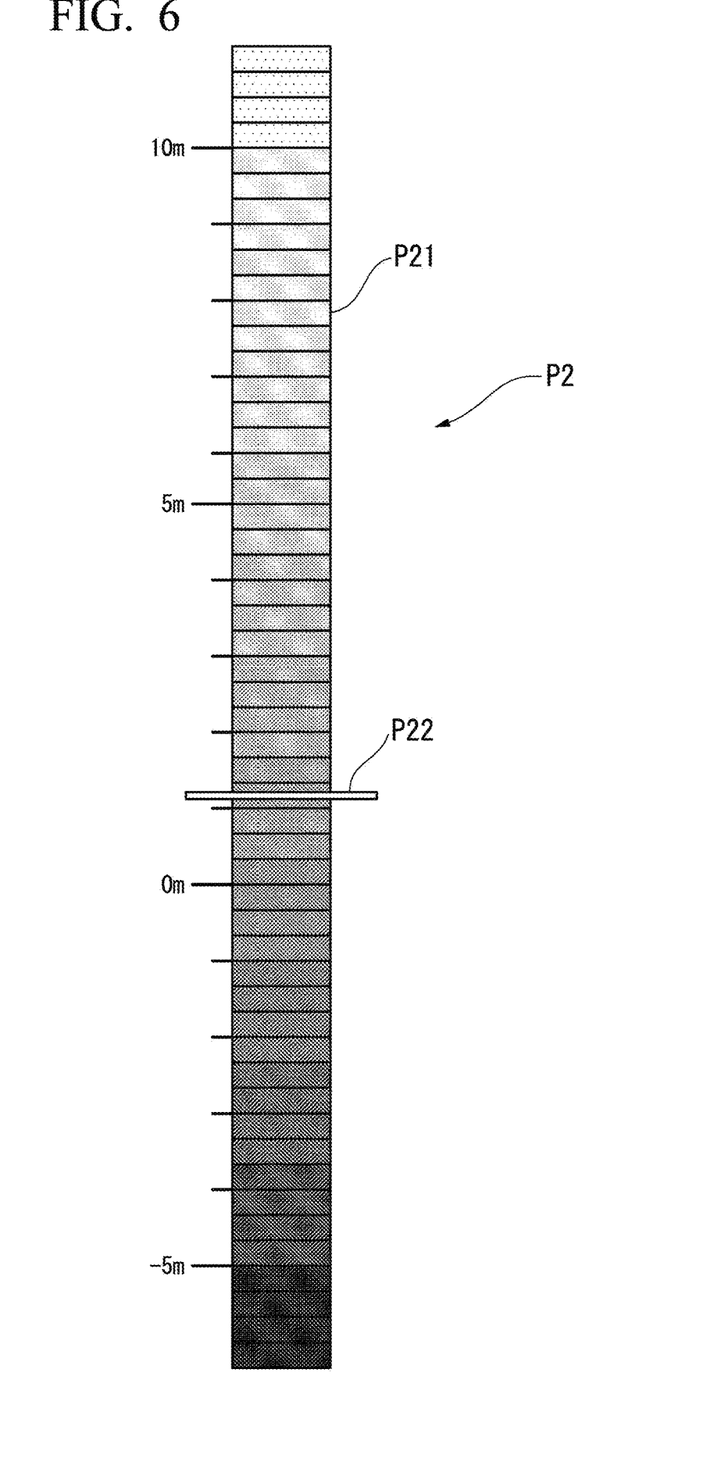
FIG. 6 is a diagram showing an example of an image of a bucket height.

FIG. 6 is a diagram showing an example of an image of teeth height.

The teeth height image generation unit 914 generates a teeth height image P2 indicating the teeth height of the work equipment 130 based on the teeth height calculated by the teeth height specification unit 913. The teeth height image P2 includes a gauge P21 having a scale representing a height and an indicator P22 disposed on the gauge P21 and representing a height of the teeth. Accordingly, the operator can estimate the teeth height by recognizing the relative positional relationship of the indicator P22 in the gauge P21. Further, the operator can accurately recognize the teeth height by reading the scale of the gauge P21 at the position where the indicator P22 is located.

Figure 7:
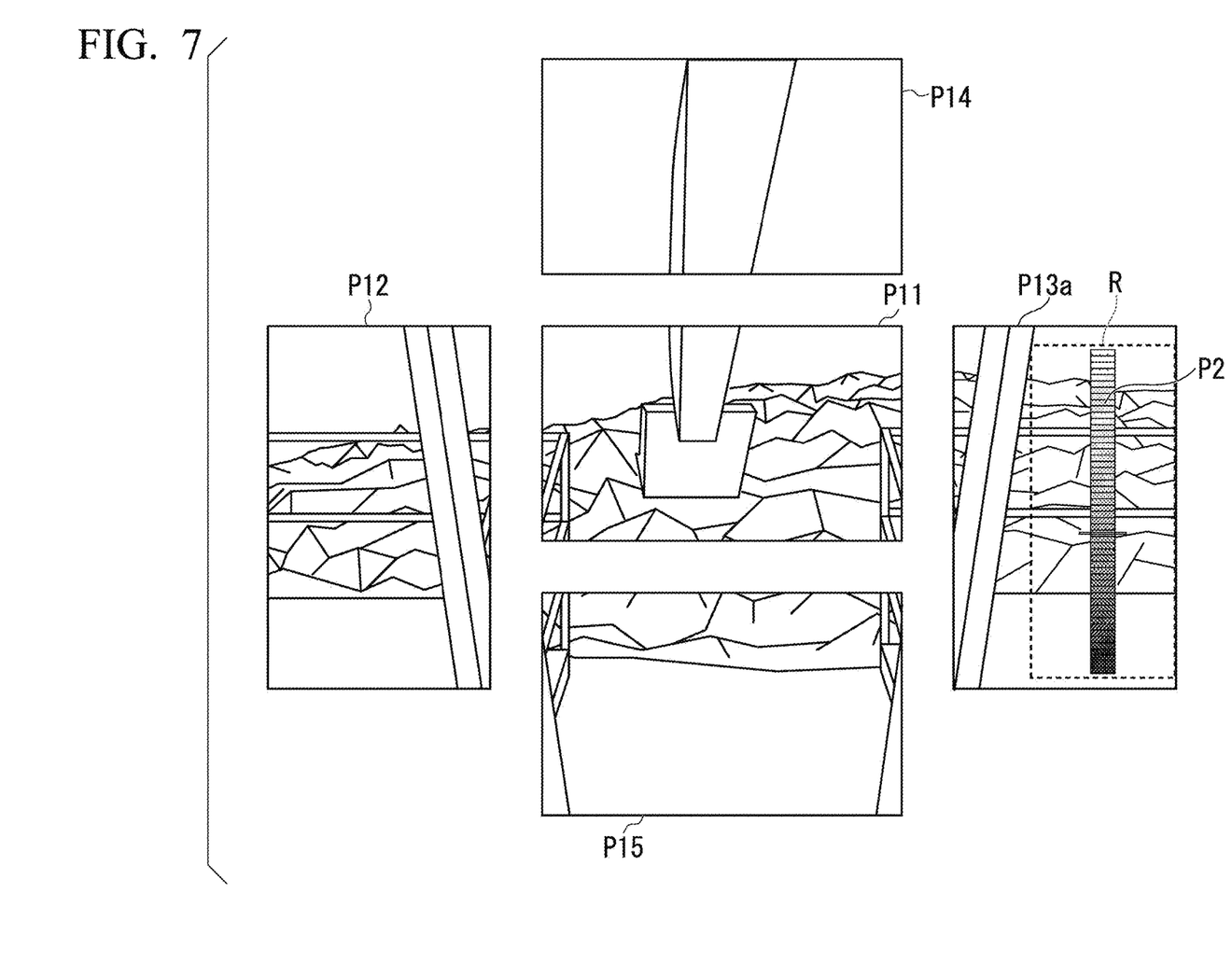
FIG. 7 is a diagram showing an example of a display image displayed on a display device according to the first embodiment.

FIG. 7 is a diagram showing an example of a display image displayed on the display device according to the first embodiment.

The display image generation unit 915 generates the display right image P13a by arranging the teeth height image P2 in an arrangement region R of the right image P13 cut out by the image cutout unit 912. The arrangement region R is, for example, a region which is a small movement of the line of sight for the operator. In addition, the arrangement region R according to another embodiment may be provided in another cut out image. In still another embodiment, the teeth height image P2 may be placed in a predetermined position.

The display control unit 916 causes the central display 521 to display the central image P11. The left image P12 is displayed on the left display 522. The control device 550 causes the right display 523 to display the display right image P13a. The control device 550 causes the upper display 524 to display the upper image P14. The control device 550 causes the lower display 525 to display the lower image P15. That is, the display control unit 916 displays a supplementary image in the arrangement area of the first display device 520 separately from the vehicle body information displayed by the second display device 530. The display control unit 916 is an example of a teeth height notification unit.

The operation signal transmission unit 917 generates an operation signal based on the operation of the operation device 540 by the operator, and transmits the operation signal to the work vehicle 100.

(Display Control Method of Remote Operation Room)

Figure 8:
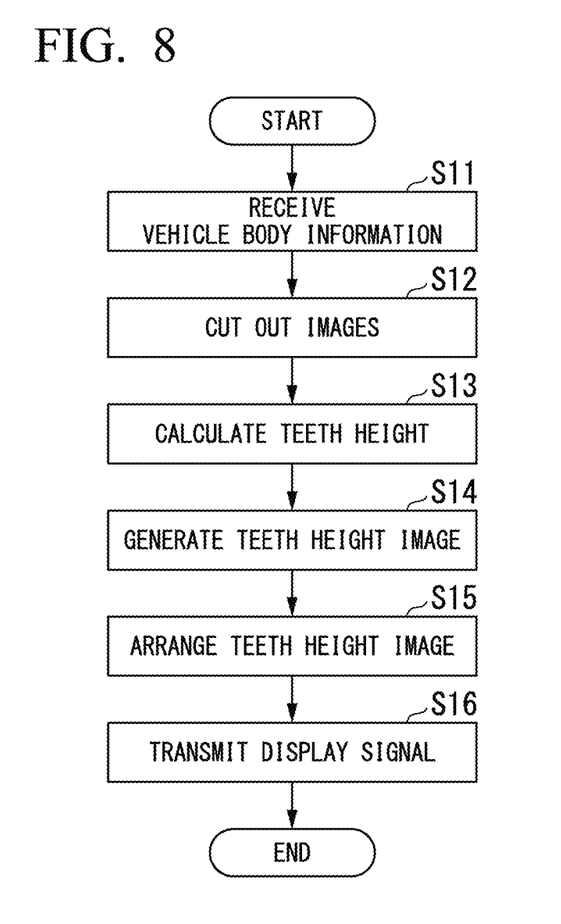
FIG. 8 is a flowchart showing a display control method by a control device of the remote operation room according to the first embodiment.

FIG. 8 is a flowchart showing a display control method by the control device of the remote operation room according to the first embodiment. When the remote operation of the work vehicle 100 is started, the control device 550 executes the display control described below at a predetermined cycle.

The vehicle body information reception unit 911 receives vehicle body information from the control device 126 of the work vehicle 100 (step S11). Next, the image cutout unit 912 cuts out the central image P11, the left image P12, the right image P13, the upper image P14, and the lower image P15 from the image P1 captured by the front camera 122 in the received vehicle body information (step S12).

The teeth height specification unit 913 calculates the teeth height of the bucket 133 based on the information on the inclination angles of the boom 131, the arm 132, and the bucket 133 among the received vehicle body information (step S13). The teeth height image generation unit 914 generates the teeth image P2 based on the teeth height (step S14).

The display image generation unit 915 generates the display right image P13a by arranging the teeth height image P2 in the arrangement region R of the right image P13 (step S15). The display control unit 916 generates a display signal for causing the first display device 520 to display the central image P11, the left image P12, the display right image P13a, the upper image P14, and the lower image P15, and transmits the display signal to the first display device 520 (step S16).

Operation and Effects

As described above, the control device 550 of the remote operation room 500 according to the first embodiment specifies the teeth height which is the height from the ground contact surface of the work equipment 130 to notify the operator of the teeth height. As a result, the operator can easily recognize the teeth height of the work equipment that is difficult to recognize due to remote operation.

Further, the control device 550 according to the first embodiment causes the first display device 520 to display a display image in which the teeth height image is arranged in the captured image captured by the front camera 122 mounted on the work vehicle 100. As a result, the operator can recognize the teeth height by visually recognizing the same display device as the image in which the work object is showing. Accordingly, the operator can easily recognize the teeth height with a small movement of the line of sight. In addition, the control device 550 according to another embodiment may cause the first display device 520 to display a numerical value indicating a height instead of the teeth height image. Further, the control device 550 according to another embodiment may notify the operator of the teeth height by a method other than the display. For example, the control device 550 according to another embodiment may notify the operator of the teeth height by generating a voice for notifying the teeth height from a speaker. The control device 550 according to another embodiment may control the operation device 540 so that the lever operation of the operation device 540 becomes heavier as the teeth height becomes lower. For example, the control device 550 can make the lever operation heavy by compressing a self-neutral spring (not shown) built in the lever of the operation device 540 by an actuator by an amount corresponding to the teeth height.

Other Embodiments

While an embodiment has been described in detail with reference to the drawings, the specific configuration is not limited to the above, and various design changes and the like can be made.

For example, in the above-described embodiment, the control device 550 calculates the teeth height, but the present invention is not limited thereto. For example, in another embodiment, the control device 126 of the work vehicle 100 or an external server device may calculate the teeth height, and the control device 550 may receive the information on the teeth height. In still another embodiment, the control device 126 of the work vehicle 100 or an external server device may generate the teeth height image, and the control device 550 may receive the teeth height image. In this case, the teeth height specification unit 913 can specify the teeth height by receiving the information of the teeth height or the teeth height image.

Further, in the embodiment described above, the control device 550 calculates and notifies the teeth height of the bucket 133; however, another embodiment is not limited to this. For example, the control device 550 according to another embodiment may calculate a bucket lowermost height, which is a distance from the ground surface to the bucket lowermost point, and may notify the calculated bucket lowermost height, instead of the teeth height. The bucket lowermost point is a point closest to the ground surface of the bucket 133. Instead of or in addition to the length from the base end portion of the bucket 133, the control device 550 can specify the bucket lowermost point by storing in advance a shape of the bucket 133 with reference to the base end portion of the bucket 133. The teeth height and the bucket lowermost height are each an example of a bucket height.

In the above-described embodiment, the bucket height notification device is mounted on the remote operation system 1, but the present invention is not limited thereto. For example, in another embodiment, the bucket height notification device may be applied to a radio control system that operates the work vehicle 100 by wireless communication at a position outside the work vehicle 100 and at which the work vehicle 100 can be visually recognized. When the bucket height notification device is applied to the radio control system, the control device may include a display device.

According to the present invention, the control device of the remote operation room can notify the operator of the height of the bucket of the work equipment which is difficult to recognize due to the remote operation.

The invention claimed is:

1. A bucket height notification device, comprising:
 a controller including a processor and a storage, the controller being programmed to
  acquire a captured image from an imaging device, the captured image including a work object and a front side of a work vehicle that is configured to be operated remotely,
  specify a bucket height from a ground surface of the work object to a bucket of work equipment included in the work vehicle; and
  provide notification of the bucket height by generating a display image and outputting the display image to a first display device disposed in a remote operation room, the display image depicting a bucket height image arranged on the captured image and the bucket height image indicating the bucket height,
 the first display device being disposed in front of an operator's seat,
 the first display device having a plurality of discrete displays including:
  a central display;
  a left display provided on a left side of the central display;
  a right display provided on a right side of the central display;
  an upper display provided on an upper side of the central display; and
  a lower display provided on a lower side of the central display, and
 the controller being programmed to display the bucket height image in an arrangement region of the right display, the arrangement region being disposed such that the bucket height image is recognizable to an operator in the operator's seat with a small movement of a line of sight of the operator.

2. The bucket height notification device according to claim 1, wherein
 the bucket height is from the bucket to a ground contact surface of the work vehicle, the ground contact surface being included in the ground surface.

3. The bucket height notification device according to claim 2, wherein
 the bucket height image includes a gauge having a scale representing a height and an indicator disposed on the gauge and representing a teeth height of the bucket, and
 the controller is programmed to generate vehicle body information including a remaining amount of fuel and display the vehicle body information on a second display device of the remote operation room.

4. The bucket height notification device according to claim 1, wherein
 the bucket height is from the bucket to a ground surface directly below the bucket, the ground surface directly below the bucket being included in the ground surface.

5. The bucket height notification device according to claim 1, wherein
 the bucket height image includes a gauge having a scale representing a height and an indicator disposed on the gauge and representing a teeth height of the bucket.

6. The bucket height notification device according to claim 1, wherein the controller is programmed to generate vehicle body information including a remaining amount of fuel and cause the vehicle body information to be displayed on a second display device disposed in the remote operation room.

7. A bucket height notification method, comprising:
using a controller including a processor and a storage to
   acquire a captured image from an imaging device, the captured image including a work object and a front side of a work vehicle that is configured to be operated remotely,
   specify a bucket height from a ground surface of the work object to a bucket of work equipment included in the work vehicle; and
   provide notification of the bucket height by generating a display image and outputting the display image to a first display device disposed in a remote operation room, the display image depicting a bucket height image arranged on the captured image and the bucket height image indicating the bucket height,
the first display device being disposed in front of an operator's seat,
the first display device having a plurality of discrete displays including:
   a central display;
   a left display provided on a left side of the central display;
   a right display provided on a right side of the central display;
   an upper display provided on an upper side of the central display; and
   a lower display provided on a lower side of the central display, and
the method including programming the controller and using the controller and the first display device to display the bucket height image in an arrangement region of the right display, the arrangement region being disposed such that the bucket height image is recognizable to an operator in the operator's seat with a small movement of a line of sight of the operator.

8. A remote operation room comprising:
a controller including a processor and a storage;
an operator's seat; and
a first display device disposed in front of the operator's seat, the first display device including a plurality of discrete displays,
the controller being programmed to
   acquire a captured image from an imaging device, the captured image including a work object and a front side of a work vehicle that is configured to be operated remotely,
   specify a bucket height from a ground surface of the work object to a bucket of work equipment included in the work vehicle; and
   provide notification of the bucket height by generating a display image to be displayed on the first display device, the display image depicting a bucket height image arranged on the captured image and the bucket height image indicating the bucket height the plurality of discrete displays including:
      a central display;
      a left display provided on a left side of the central display;
      a right display provided on a right side of the central display;
      an upper display provided on an upper side of the central display; and
      a lower display provided on a lower side of the central display, and
   the controller being programmed to display the bucket height image in an arrangement region of the right display, the arrangement region being disposed such that the bucket height image is recognizable to an operator in the operator's seat with a small movement of a line of sight of the operator.

9. The remote operation room according to claim 8, wherein
the controller is programmed to cut out sections of the captured image to obtain a central image, a left image, a right image an upper image, and a lower image and display each of the sections on the center display, the left display, the right display, the upper display, and the lower display, respectively.

10. The remote operation room according to claim 8, wherein
the controller is programmed to generate the bucket height image as a teeth height image indicating a height of teeth of the bucket from the ground surface.

11. The remote operation room according to claim 10, wherein
the teeth height image includes a scale representing height and an indicator positioned with respect to the scale so as to indicate the height of the teeth.

12. The remote operation room according to claim 8, further comprising
a second display device different from the first display device,
the controller being programmed to generate vehicle body information including a remaining amount of fuel and display the vehicle body information on the second display device.

13. The remote operation room according to claim 12, wherein
the second display device is disposed diagonally forward of the operator's seat.

14. The remote operation room according to claim 8, further comprising
an operation device arranged to be operated by the operator from the operator's seat, the operation device being configured to output an operation signal for operating the work vehicle,
the controller being programmed to receive the operation signal and transmit the operation signal to the work vehicle.

* * * * *